US012569837B2

(12) United States Patent
Wang et al.

(10) Patent No.: US 12,569,837 B2
(45) Date of Patent: Mar. 10, 2026

(54) EMBEDDED HYDROTHERMAL-RESISTANT NiSn-CS NANO-CATALYST AND PREPARATION METHOD THEREFOR AND APPLICATION THEREOF

(71) Applicant: GUANGDONG UNIVERSITY OF TECHNOLOGY, Guangzhou (CN)

(72) Inventors: Tiejun Wang, Guangzhou (CN); Qian Zhang, Guangzhou (CN); Xiaoping Wu, Guangzhou (CN); Songbai Qiu, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 19/169,072

(22) Filed: Apr. 3, 2025

(65) Prior Publication Data

US 2025/0229261 A1    Jul. 17, 2025

Related U.S. Application Data

(63) Continuation-in-part of application No. PCT/CN2021/127576, filed on Oct. 29, 2021.

(30) Foreign Application Priority Data

Aug. 26, 2021    (CN) .......................... 202110991336.9

(51) Int. Cl.
| | |
|---|---|
| *B01J 31/12* | (2006.01) |
| *B01J 35/45* | (2024.01) |
| *B01J 37/03* | (2006.01) |
| *B01J 37/08* | (2006.01) |

(52) U.S. Cl.
CPC ............. *B01J 31/123* (2013.01); *B01J 35/45* (2024.01); *B01J 37/036* (2013.01); *B01J 37/08* (2013.01);
(Continued)

(58) Field of Classification Search
CPC ........ B01J 31/123; B01J 35/45; B01J 37/036; B01J 37/08
See application file for complete search history.

(56) References Cited

U.S. PATENT DOCUMENTS

| | | |
|---|---|---|
| 2003/0176277 A1 | 9/2003 | Suh et al. |
| 2004/0038811 A1 | 2/2004 | Parmaliana et al. |

FOREIGN PATENT DOCUMENTS

| | | |
|---|---|---|
| CN | 102936297 A | 2/2013 |
| CN | 104289248 A | 1/2015 |

(Continued)

OTHER PUBLICATIONS

Ailing Qiu et al., Hydrogen Production by Liquid-Phase Reforming of Ethylene Glycol over Sn Modified Ni/γ-Al2O3 Catalyst, Petrochemical Technology, 2013, pp. 724-729, vol. 42, No. 7.
(Continued)

*Primary Examiner* — James A Fiorito

(57) ABSTRACT

The present invention discloses an embedded hydrothermal-resistant NiSn—CS nano-catalyst and a preparation method therefor and use thereof. The method includes the following steps: firstly dissolving a Ni salt, a Sn salt and chitosan to form a sol solution; and then removing a solvent from the sol solution to obtain a gel, and subjecting the gel to carbonization treatment to obtain the embedded hydrothermal-resistant NiSn—CS nano-catalyst; wherein temperature of the carbonization treatment is 400° C. to 600° C., and duration of the carbonization treatment is 1 to 4 hours. The embedded hydrothermal-resistant NiSn—CS nano-catalyst prepared by the present invention significantly improves the dispersion of NiSn catalytic active sites and the stability of the structure and activity in hydrothermal environments. When used for the synthesis of higher alcohols from lower alcohols, the catalyst demonstrates excellent catalytic effi-
(Continued)

ciency and hydrothermal resistance, as well as easy separation and recycling, low pollution, and excellent recycling performance.

4 Claims, 3 Drawing Sheets

(52) U.S. Cl.
CPC ...... *B01J 2531/42* (2013.01); *B01J 2531/847* (2013.01)

(56) References Cited

FOREIGN PATENT DOCUMENTS

| | | | |
|---|---|---|---|
| CN | 104538595 | A | 4/2015 |
| CN | 107895783 | A | 4/2018 |
| CN | 110102309 | A | 8/2019 |
| CN | 112973707 | A | 6/2021 |
| JP | 2010269284 | A | 12/2010 |
| WO | 2017207555 | A1 | 12/2017 |
| WO | 2020109304 | A1 | 6/2020 |

OTHER PUBLICATIONS

Notice of Allowance of counterpart Chinese Patent Application No. 202110991336.9 issued on Aug. 24, 2024.
Second Office Action of counterpart Chinese Patent Application No. 202110991336.9 issued on Jun. 19, 2024.
First Office Action of counterpart Chinese Patent Application No. 202110991336.9 issued on Dec. 7, 2023.

EMBEDDED HYDROTHERMAL-RESISTANT NiSn-CS NANO-CATALYST AND PREPARATION METHOD THEREFOR AND APPLICATION THEREOF

CROSS-REFERENCE TO RELATED APPLICATIONS

The present application is a continuation-in-part application of PCT application No. PCT/CN2021/127576 filed on Oct. 29, 2021, which claims the benefit of Chinese Patent Application No. 202110991336.9 filed on Aug. 26, 2021. The contents of all of the aforementioned applications are incorporated by reference herein in their entirety.

TECHNICAL FIELD

The present invention relates to the technical field of catalysts, and more specifically, relates to an embedded hydrothermal-resistant NiSn—CS nano-catalyst and a preparation method therefor and application.

BACKGROUND

As a deacetylation product of chitin, Chitosan (CS) is one of the most abundant natural biomacromolecules and is a precious natural alkaline polysaccharide, which is soluble in dilute acid solutions. Chitosan has a wide range of applications in materials and other industries due to its non-toxic, odorless, and biodegradable properties. Chitosan mainly has two functional groups, amino and hydroxyl, which can coordinate with heavy metal ions to form stable chelates. C4+ higher alcohols are ideal advanced biofuels due to their immiscibility with water, non-corrosiveness, high energy density, and octane value close to gasoline. The Guerbet coupling reaction is an ideal choice for the synthesis of lower alcohols into higher alcohols. It is generally believed that the Guerbet coupling mechanism involves multiple steps. Initially, the raw material alcohol is dehydrogenated to form aldehydes, followed by aldol condensation. Subsequently, the condensation product is dehydrated to produce unsaturated olefine aldehydes, which are then hydrogenated to produce higher alcohols. It is generally believed that alcohol dehydrogenation and olefine aldehyde hydrogenation are carried out under the catalytic action of metal catalysts, while aldol condensation is carried out over the acids or bases sites. Therefore, the preparation of higher alcohols by lower alcohols coupling requires metal catalysts with hydrogenation-dehydrogenation ability, and acidic or basic catalysts.

At present, the homogeneous catalysts of Ir-based and Ru-based complexes have good catalytic performance in the preparation of higher alcohols by catalytic coupling of lower alcohols. However, there are disadvantages such as high cost of iridium and ruthenium, difficult separation after reaction, and discontinuous operation. As a non-precious metal element, metal Ni is abundant in the earth's crust and is one of the best substitute materials for precious metals. The doping of metal Sn can change the electronic environment of metal Ni, thereby regulating the metallicity of metal Ni and weakening the methanation during the dehydrogenation of small molecular alcohols, so as to facilitate the generation of higher alcohols. For example, CN104289248A discloses a carbon nanotube composite material and a preparation method and application, providing a composite material where carbon nanotubes are coated with a carbon layer embedded with precious metal nanoparticles. The composite material consists of carbon nanotubes and a carbon layer coated on the outside of the carbon nanotubes. The carbon layer is embedded with precious metal nanoparticles, effectively preventing strong corrosion to the inner carbon nanotubes by high acidity and high voltage during catalytic oxidation-reduction reactions, maintaining good conductivity of the catalyst, and improving its corrosion resistance stability and catalytic activity. However, its cost is high, the preparation process is complex, and the catalyst does not have good hydrothermal resistance.

SUMMARY

The objective of the present invention is to overcome the drawbacks and deficiencies of poor particle dispersity of active components and poor hydrothermal resistance in the NiSn nano-catalyst, and to provide a preparation method for an embedded hydrothermal-resistant NiSn—CS nano-catalyst. A Ni salt, a Sn salt and chitosan are mixed to form a sol solution. The solvent is then removed from the sol solution to obtain a gel. Finally, the gel is carbonized to produce the embedded, hydrothermal-resistant NiSn—CS nano-catalyst.

Another objective of the present invention is to provide an embedded hydrothermal-resistant NiSn—CS nano-catalyst.

Another objective of the present invention is to provide application of the embedded hydrothermal-resistant NiSn—CS nano-catalyst in synthesis of higher alcohols by lower alcohols.

The above-mentioned objectives are achieved by the following technical solutions:

A preparation method for an embedded hydrothermal-resistant NiSn—CS nano-catalyst, includes the following steps:

S1, dissolving a Ni salt, a Sn salt and chitosan to form a sol solution; and

S2, removing a solvent from the sol solution in S1 to obtain a gel, drying the gel to obtain a catalyst precursor, and then subjecting the gel to carbonization treatment in an inert atmosphere to obtain the embedded hydrothermal-resistant NiSn—CS nano-catalyst;

wherein the carbonization treatment is performed at a temperature of 400° C. to 600° C. for a duration of 1 to 4 hours.

Particularly, the sol solution in S1 can be prepared according to the following: dissolving the Ni salt, the Sn salt and chitosan in a 1-5 wt % acetic acid aqueous solution, heating to 60° C.-90° C. with stirring at a stirring rate of 300-1000 rpm, and obtaining the sol solution after the chitosan is completely dissolved.

A drying temperature for the sol solution in S2 is 40° C.-70° C., preferably 50° C.; and temperature for the carbonization treatment is preferably 500° C. A too low carbonization temperature may lead to insufficient carbonization of chitosan, incomplete exposure of metal active sites, while a too high carbonization temperature may easily cause aggregation and growth of metal nanoparticles, thereby affecting the catalytic activity of the catalyst.

Short carbonization duration may lead to insufficient carbonization of chitosan, incomplete reduction of metal ions, and a decrease in metal active sites; while excessive carbonization duration may damage the structure of the carbon layer and cause metal particles to aggregate and grow, thereby affecting the catalytic activity of the catalyst.

Preferably, chitosan of S1 has a weight-average molecular weight (Mw) of 700-250000.

Preferably, chitosan of S1 has a Mw of 100000-150000.

Chitosan contains various hydroxyl, amino, and carboxyl groups that can chelate with Ni and Sn ions, facilitating the generation and dispersion of NiSn active sites in the catalyst, while coating the surface of NiSn nanoparticles to form a hydrothermal-resistant catalyst structure.

Preferably, a molar ratio of the Ni salt to the Sn salt in S1 is 1:(0.03-0.24).

More preferably, the molar ratio of the Ni salt to the Sn salt is 1:0.06.

Preferably, a molar ratio of a mixture of Ni salt and Sn salt to chitosan in S1 is 1:(0.2-2).

Preferably, the molar ratio of the mixture of Ni salt and Sn salt to chitosan in S1 is 1:(1-1.5).

If the molar ratio of the mixture of Ni salt and Sn salt to chitosan is too small, the metal active sites on the catalyst are too less and the catalyst performance is poor; while the molar ratio of the mixture of Ni salt and Sn salt to chitosan is too high, chitosan cannot fully reduce metal ions, as well as NiSn nanoparticles cannot be fully embedded into the carbon layer, thereby reducing the activity of the catalyst.

An embedded hydrothermal-resistant NiSn—CS nano-catalyst prepared by the above-mentioned preparation method.

The embedded hydrothermal-resistant NiSn—CS nano-catalyst prepared by the present invention may be used in catalyzing synthesis of higher alcohols from lower alcohols.

Preferably, the catalysis conditions are as follows: a mass ratio of the NiSn—CS nano-catalyst to inorganic base to lower alcohol to water is 1:(1-4):(10-43):(10-43), a catalysis reaction temperature is 200° C.-250° C., a pressure is 0.1-2 MPa; and more preferably, the mass ratio of the NiSn—CS nano-catalyst to inorganic base to lower alcohol to water is 1:3:33:33, the catalysis temperature is 230° C., the pressure is 0.1 MPa.

Compared to the prior art, the present invention has the following beneficial effects:

The present invention provides an embedded hydrothermal-resistant NiSn—CS nano-catalyst, where the NiSn nanoparticles in this catalyst are uniformly distributed on the carbon layer, significantly improving the dispersion of NiSn catalytic active sites and the stability of the structure and activity in hydrothermal environments. When used for the synthesis of higher alcohols from lower alcohols, after 5 cycles of catalysis, the structure remains basically unchanged, and the ethanol conversion rate is still as high as 65.7% (66.3% in the first cycle). The selectivity to C4+ higher alcohol reaches 83.4%, demonstrating excellent catalytic efficiency and hydrothermal resistance, as well as easy separation and recycling, low pollution, and excellent recycling performance.

The preparation method of the present invention does not require complex pre-treatment and the preparation process is simple.

DETAILED DESCRIPTION OF THE EMBODIMENTS

Figure 1:
FIG. 1 is a SEM image of an embedded hydrothermal-resistant NiSn—CS nano-catalyst in Example 4 of the present invention.

The present invention will be further described in conjunction with specific embodiments, but the examples do not limit the present invention in any form. Unless otherwise specified, the raw materials and reagents used in the examples of the present invention are conventional purchased raw materials and reagents.

Example 1

A preparation method for an embedded hydrothermal-resistant NiSn—CS nano-catalyst included the following steps:

S1, certain amounts of $Ni(NO_3)_2 \cdot 6H_2O$, $SnCl_4 \cdot 5H_2O$ and chitosan (Mw: 700-1000) were simultaneously added to an acetic acid aqueous solution, and stirred to form a homogenous sol, where a mass ratio of $Ni(NO_3)_2 \cdot 6H_2O$ to $SnCl_4 \cdot 5H_2O$ to chitosan to acetic acid to water was 1.84:0.055:1:0.63:50, i.e. a molar ratio of a metal precursor (a mixture of the Ni salt and the Sn salt) to chitosan monomer was 1:1; and S2, the sol obtained in S1 was transferred to a 50° C. drying oven for drying for 48 hours to obtain a NiSn—CS nano-catalyst precursor, and then the nano-catalyst precursor was subjected to carbonization treatment at 500° C. in $N_2$ atmosphere for 2 hours to obtain the embedded hydrothermal-resistant NiSn—CS nano-catalyst.

Example 2

A preparation method for an embedded hydrothermal-resistant NiSn—CS nano-catalyst included the following steps:

S1, certain amounts of $Ni(NO_3)_2 \cdot 6H_2O$, $SnCl_4 \cdot 5H_2O$ and chitosan (Mw: 50000) were simultaneously added to an acetic acid aqueous solution, and stirred to form a homogenous sol, where a mass ratio of $Ni(NO_3)_2 \cdot 6H_2O$ to $SnCl_4 \cdot 5H_2O$ to chitosan to acetic acid to water was 1.84:0.66:1:0.63:50, i.e. a molar ratio of a metal precursor (a mixture of the Ni salt and the Sn salt) to chitosan monomer was 1:1; and S2, the sol obtained in S1 was transferred to a 50° C. drying oven for drying for 48 hours to obtain a NiSn—CS nano-catalyst precursor, and then the nano-catalyst precursor was subjected to carbonization treatment at 500° C. in $N_2$ atmosphere for 2 hours to obtain the embedded hydrothermal-resistant NiSn—CS nano-catalyst.

Example 3

A preparation method for an embedded hydrothermal-resistant NiSn—CS nano-catalyst included the following steps:

S1, certain amounts of $Ni(NO_3)_2\cdot 6H_2O$, $SnCl_4\cdot 5H_2O$ and chitosan (Mw: 100000) were simultaneously added to an acetic acid aqueous solution, and stirred to form a homogenous sol, where a mass ratio of $Ni(NO_3)_2\cdot 6H_2O$ to $SnCl_4\cdot 5H_2O$ to chitosan to acetic acid to water was 1.84:0.11:1:0.63:50, i.e. a molar ratio of a metal precursor (a mixture of the Ni salt and the Sn salt) to chitosan monomer was 1:1; and S2, the sol obtained in S1 was transferred to a 50° C. drying oven for drying for 48 hours to obtain a NiSn—CS nano-catalyst precursor, and then the nano-catalyst precursor was subjected to carbonization treatment at 500° C. in $N_2$ atmosphere for 2 hours to obtain the embedded hydrothermal-resistant NiSn—CS nano-catalyst.

Examples 4 to 5

In Example 4, the chitosan of S1 has a Mw of 150000, and others were the same as those in Example 3.

In Example 5, the chitosan of S1 has a Mw of 250000, and others were the same as those in Example 3.

Examples 6 to 7

In Example 6, temperature of the carbonization treatment in S2 was 400° C., and others were the same as those in Example 4.

In Example 7, temperature of the carbonization treatment in S2 was 600° C., and others were the same as those in Example 4.

Examples 8 to 9

In Example 8, duration of the carbonization treatment in S2 was 1 hour, and others were the same as those in Example 4.

In Example 9, duration of the carbonization treatment in S2 was 4 hours, and others were the same as those in Example 4.

Examples 10 to 12

In Example 10, a molar ratio of the mixture of Ni salt and Sn salt to chitosan was 1:1.5 in S1, and others were the same as those in Example 4.

In Example 11, a molar ratio of the mixture of Ni salt and Sn salt to chitosan was 1:2 in S1, and others were the same as those in Example 4.

In Example 12, a molar ratio of the mixture of Ni salt and Sn salt to chitosan was 1:0.2 in S1, and others were the same as those in Example 4.

Comparative Examples 1 to 2

In Comparative Example 1, temperature of the carbonization treatment in S2 was 300° C., and others were the same as those in Example 4.

In Comparative Example 2, temperature of the carbonization treatment in S2 was 700° C., and others were the same as those in Example 4.

Comparative Example 3

A preparation method for a NiSn nano-catalyst included the following steps:

S1, certain amounts of $Ni(NO_3)_2\cdot 6H_2O$ and $SnCl_4\cdot 5H_2O$ were simultaneously added to an acetic acid aqueous solution, and stirred to form a uniform solution, where a mass ratio of $Ni(NO_3)_2\cdot 6H_2O$ to $SnCl_4\cdot 5H_2O$ to acetic acid to water was 1.84:0.11:0.63:50; and S2, the uniform solution obtained in S1 was transferred to a 50° C. drying oven for drying for 48 hours to obtain a NiSn nano-catalyst precursor, and then the nano-catalyst precursor was subjected to carbonization treatment at 500° C. in $N_2$ atmosphere for 2 hours to obtain the NiSn nano-catalyst.

TABLE 1

Summary of respective examples and comparative examples

| Number | Mw | Temperature of carbonization treatment | Duration of carbonization treatment | Molar ratio of Ni salt to Sn salt | Molar ratio of mixture of Ni salt and Sn salt to chitosan |
|---|---|---|---|---|---|
| Example 1 | 700-1000 | 500° C. | 2 h | 1:0.03 | 1:1 |
| Example 2 | 50000 | 500° C. | 2 h | 1:0.24 | 1:1 |
| Example 3 | 100000 | 500° C. | 2 h | 1:0.06 | 1:1 |
| Example 4 | 150000 | 500° C. | 2 h | 1:0.06 | 1:1 |
| Example 5 | 250000 | 500° C. | 2 h | 1:0.06 | 1:1 |
| Example 6 | 150000 | 400° C. | 2 h | 1:0.06 | 1:1 |
| Example 7 | 150000 | 600° C. | 2 h | 1:0.06 | 1:1 |
| Example 8 | 150000 | 500° C. | 1 h | 1:0.06 | 1:1 |
| Example 9 | 150000 | 500° C. | 4 h | 1:0.06 | 1:1 |
| Example 10 | 150000 | 500° C. | 2 h | 1:0.06 | 1:1.5 |
| Example 11 | 150000 | 500 ° C. | 2 h | 1:0.06 | 1:2 |
| Example 12 | 150000 | 500° C. | 2 h | 1:0.06 | 1:0.2 |
| Comparative Example 1 | 150000 | 300° C. | 2 h | 1:0.06 | 1:1 |
| Comparative Example 2 | 150000 | 700 ° C. | 2 h | 1:0.06 | 1:1 |
| Comparative Example 3 | / | 500° C. | 2 h | 1:0.06 | / |

Result Test (1) SEM and TEM Tests

Figure 2:
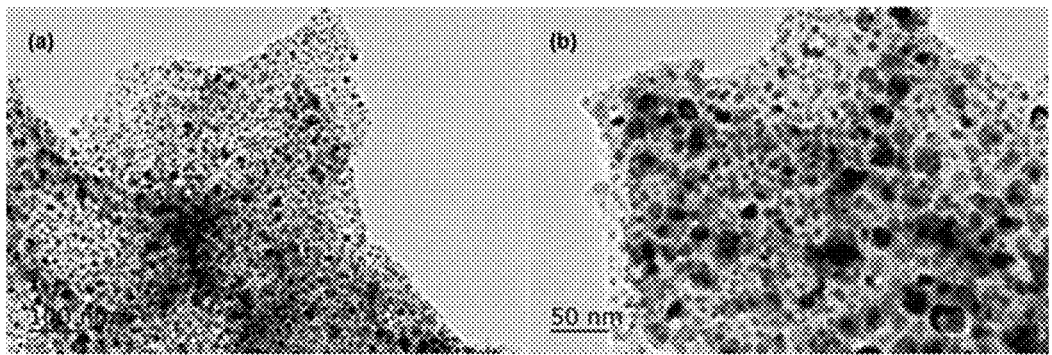
FIG. 2 is a TEM image of the embedded hydrothermal-resistant NiSn—CS nano-catalyst in Example 4 of the present invention at different magnifications.
Figure 3:
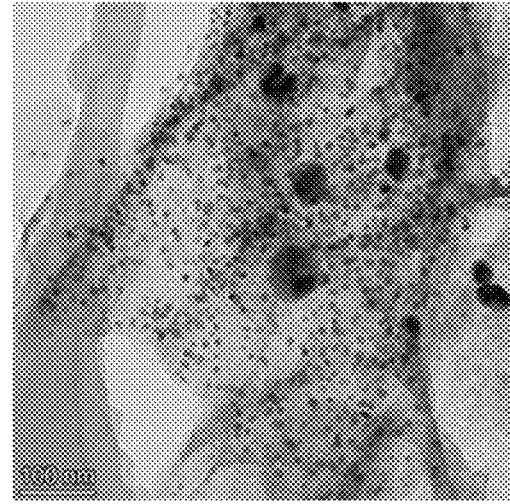
FIG. 3 is a TEM image of the embedded hydrothermal-resistant NiSn—CS nano-catalyst in Example 4 of the present invention after 5 cycles.
Figure 4:
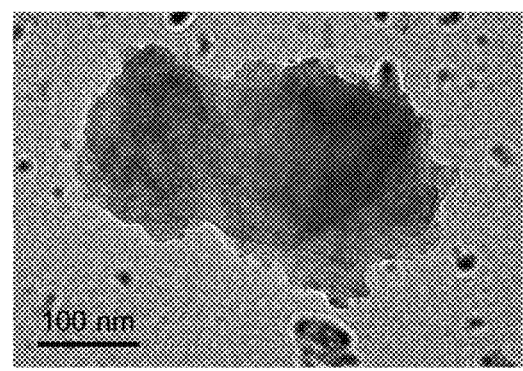
FIG. 4 is a TEM image of a NiSn nano-catalyst in Comparative Example 3 of the present invention.
Figure 5:
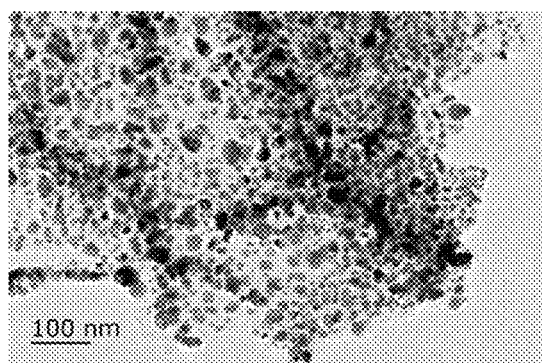
FIG. 5 is a TEM image of an embedded hydrothermal-resistant NiSn—CS nano-catalyst in Example 6 of the present invention.
Figure 6:
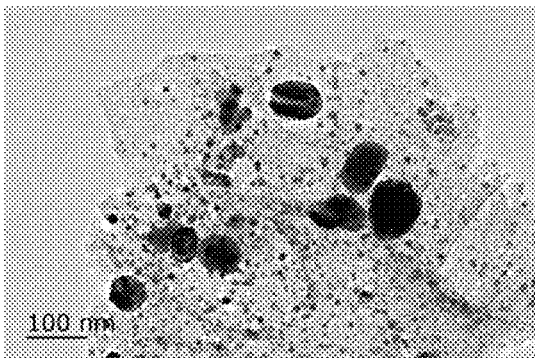
FIG. 6 is a TEM image of an embedded hydrothermal-resistant NiSn—CS nano-catalyst in Comparative Example 2 of the present invention.

FIG. 1 and FIG. 2 are the SEM image and TEM images at different magnifications of the NiSn—CS nano-catalyst in Example 4, respectively. From the SEM image, it can be seen that the prepared catalyst has an embedded structure, with carbon-wrapped NiSn nanoparticles embedded in a thin layer of carbon, with small particle diameter and good dispersion. FIG. 3 shows the TEM image of the product obtained in Example 4 after 5 cycles of catalysis. Compared with the structure before the reaction (FIG. 2), it can be seen that the catalyst structure is stable. FIG. 4 shows the TEM image of the product obtained from Comparative Example 3, which shows that the NiSn nanoparticles are relatively large and severely agglomerated. FIG. 5 shows the TEM image of the product obtained in Example 6, where the NiSn nanoparticles in the catalyst are larger and the carbon layer is thicker. FIG. 6 shows the TEM image of the product obtained from Comparative Example 2, wherein the NiSn nanoparticles in the catalyst have a larger particle size and are prone to aggregation, resulting in poor dispersion, and low reaction activity.

(2) XRD Test

Figure 7:
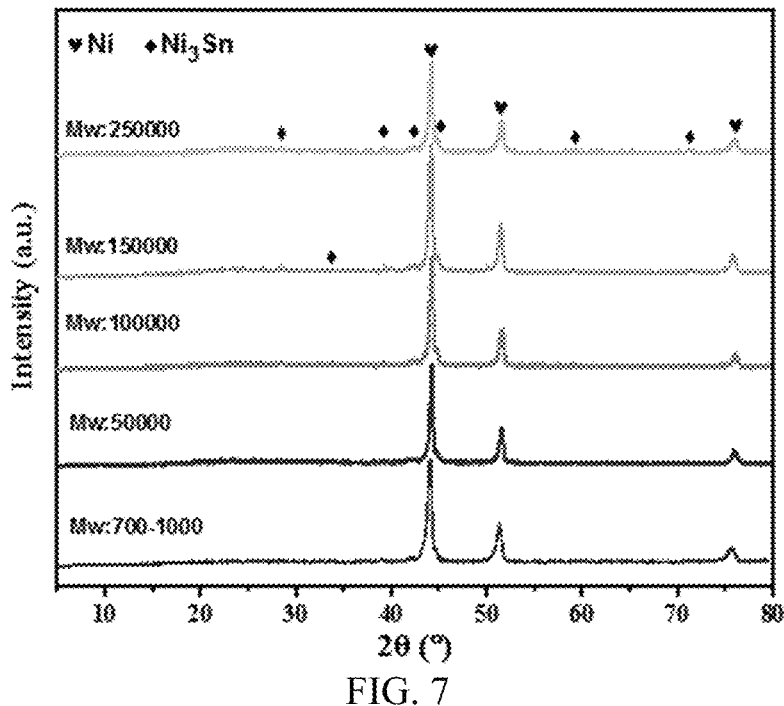
FIG. 7 is a XRD diagram of embedded hydrothermal-resistant NiSn—CS nano-catalysts in Examples 1 to 5 of the present invention.

The XRD diagram of the products obtained in Examples 1-5 of the present invention are shown in FIG. 7. As the molecular weight of chitosan increases, the characteristic diffraction peaks of metal Ni and NiSn—CS gradually increase. NiSn—CS plays a decisive role in the catalytic process, indicating that chitosan as a carbon source in the carbon shell layer is beneficial for achieving the stability of the metal sites. However, as the molecular weight of chitosan continues to increase, the crystal phases of metal Ni and NiSn—CS gradually weaken.

(3) Catalysis Performance Test of Catalyst

The test method is as follows: the products obtained from Examples 1 to 12 and Comparative Examples 1 to 3, with a homogeneous base (NaOH), synergistically catalyzed the carbon-carbon coupling reaction of ethanol to form higher fuel alcohols in a 70 mL steel magnetic stirring reactor. The mass ratio of catalyst to NaOH to ethanol to water was 1:3:33:33, the reaction temperature was 230° C., the initial pressure was 0.1 MPa, and the reaction duration was 12 hours. After the reaction was completed, the reactor was cooled to room temperature, and then centrifugation and filtration were carried out to obtain liquid and catalyst solid phases. The gas and liquid phase products were collected, and the liquid phase product was centrifuged and left to stand to accelerate spontaneous phase separation and obtain organic and aqueous phases. The liquid phase product was separated by centrifugation and analyzed by gas chromatography. The main product in the organic phase is C4+ higher alcohols. The catalyst prepared in Example 4 was taken for repeating the synergistic catalysis, with homogeneous base (NaOH), of the carbon-carbon coupling reaction of ethanol to form higher in the magnetic stirring reactor, under the same conditions as above. This process was repeated four times.

TABLE 2

Catalytic activity results of the products obtained in respective examples and comparative examples

| Number | Ethanol conversion rate (C-mol %) | Yield of higher alcohol (C-mol %) | Selectivity of higher alcohol (%) |
|---|---|---|---|
| Example 1 | 60.5 | 37.2 | 92.3 |
| Example 2 | 61.3 | 38.6 | 91.8 |
| Example 3 | 69.0 | 38.2 | 94.7 |
| Example 4 | 68.7 | 39.7 | 98.7 |
| Example 5 | 66.1 | 41.5 | 94.2 |
| Example 6 | 68.4 | 38.2 | 93.8 |
| Example 7 | 63.9 | 38.5 | 94.6 |
| Example 8 | 55.4 | 32.3 | 83.8 |
| Example 9 | 52.9 | 31.6 | 82.1 |
| Example 10 | 66.3 | 40.5 | 93.9 |
| Example 11 | 58.8 | 35.4 | 88.2 |
| Example 12 | 53.2 | 33.7 | 85.9 |
| Comparative Example 1 | 28.2 | 11.3 | 76.7 |
| Comparative Example 2 | 8.7 | 4.5 | 96.7 |
| Comparative Example 3 | 28.2 | 11.3 | 76.7 |

From Examples 1-5, it can be seen that during the preparation process, as the molecular weight of chitosan increases, the catalytic effect of the prepared catalyst for synthesizing higher alcohols shows an increasing trend followed by a decreasing trend. This may be related to the thickness of the carbon shell layer wrapped around the surface of NiSn nanoparticles. Appropriate carbon shell thickness is beneficial for protecting the metal core of the catalyst, enhancing its catalytic stability in hydrothermal reaction environment, and thus improving the conversion rate of ethanol and the selectivity of liquid-phase generation. As the molecular weight of chitosan continues to increase, the thickness of the carbon shell layer also increases, which is not conducive to the material transfer between the aqueous phase and the metal active core of the catalyst in the reaction, resulting in a decrease in the conversion rate of ethanol.

From Example 4, Examples 6-7, and Comparative Examples 1-2, it can be seen that a too low carbonization temperature can lead to insufficient carbonization of chitosan and incomplete exposure of metal active sites; while a too high carbonization temperature may easily cause the metal particles to aggregate and grow, thereby affecting the catalytic activity of the catalyst. Among them, the embedded hydrothermal-resistant NiSn—CS nano-catalyst prepared at a carbonization temperature of 500° C. has better catalytic activity.

From Examples 4 and 8-9, it can be seen that a short carbonization duration can lead to insufficient carbonization of chitosan, incomplete reduction of metal ions, and a decrease in metal active sites; while a too long carbonization duration can damage the structure of the carbon layer and cause metal particles to aggregate and grow, thereby affecting the catalytic activity of the catalyst. Among them, the embedded hydrothermal-resistant NiSn—CS nano-catalyst prepared with a carbonization duration of 2 hours has better catalytic activity.

From Examples 4 and 10-12, it can be seen that the molar ratio of the mixture of Ni salt and Sn salt to chitosan is too small, so that the metal active sites on the catalyst are too less and the catalyst performance is poor; while the molar ratio of the mixture of Ni salt and Sn salt to chitosan is too high, and chitosan cannot fully reduce metal ions, as well as NiSn nanoparticles cannot be fully embedded into the carbon layer, thereby reducing the activity of the catalyst. Among them, the embedded hydrothermal-resistant NiSn—CS nano-catalyst prepared with a molar ratio of a mixture of Ni salt and Sn salt to chitosan being 1:1 has better catalytic activity.

The catalysts prepared by the present invention exhibit excellent performance in catalyzing the synthesis of C4+ higher alcohols from ethanol, with the highest ethanol conversion rate reaching 66.3% and the C4+ higher alcohol selectivity reaching 85.1%.

TABLE 3

The 1st, 3rd, and 5th Catalytic activity results of the catalyst prepared in Example 4

| Number | Ethanol conversion rate (C-mol %) | Yield of higher alcohol (C-mol %) | Selectivity of higher alcohol (%) |
|---|---|---|---|
| The 1st time | 66.3 | 39.7 | 95.5 |
| The 3rd time | 65.9 | 38.4 | 95.2 |
| The 5th time | 65.7 | 36.5 | 94.8 |

The catalytic activity results of the catalyst prepared in Example 4 in catalyzing the synthesis of C4+ higher alcohols from ethanol are shown in Table 3. From the data in the table, it can be seen that its catalytic performance is stable. Even after the fifth cycle of catalysis, the ethanol conversion rate is still as high as 65.7%, and the C4+ higher alcohol selectivity reaches 94.8%.

Obviously, the above embodiments of the present invention are only examples provided to clearly illustrate the present invention, and are not limitations on the embodiments of the present invention. For ordinary technical personnel in the art, other forms of changes or modifications can be made based on the above description. It is not necessary and impossible to exhaustively list all implementation methods here. Any modifications, equivalent substitutions, and improvements made within the spirit and principles of the present invention shall be included within the scope of protection of the claims of the present invention.

What is claimed is:

1. A preparation method for an embedded hydrothermal-resistant NiSn—CS nano-catalyst, characterized in that, the preparation method comprises the following steps:

S1, dissolving a Ni salt, a Sn salt and chitosan $(C_6H_{11}NO_4)n$ to form a sol solution, wherein a molar ratio of a mixture of the Ni salt and the Sn salt to the chitosan is 1:(1-1.5), and the chitosan has a Mw of 700-250000; and S2, removing a solvent from the sol solution in S1 to obtain a gel, and subjecting the gel to carbonization treatment in an inert atmosphere to obtain the embedded hydrothermal-resistant NiSn—CS nano-catalyst;

wherein temperature of the carbonization treatment is 400° C. to 600° C., and duration of the carbonization treatment is 2 hours.

2. The preparation method for the embedded hydrothermal-resistant NiSn—CS nano-catalyst according to claim 1, wherein the chitosan of S1 has a Mw of 100000-150000.

3. The preparation method for the embedded hydrothermal-resistant NiSn—CS nano-catalyst according to claim 1, wherein a molar ratio of the Ni salt to the Sn salt in S1 is 1:(0.03-0.24).

4. The preparation method for the embedded hydrothermal-resistant NiSn—CS nano-catalyst according to claim 1, wherein the temperature of the carbonization treatment is 500° C., and the duration of the carbonization treatment is 2 hours.

* * * * *